US012393971B2

(12) United States Patent
Khamis et al.

(10) Patent No.: US 12,393,971 B2
(45) Date of Patent: Aug. 19, 2025

(54) METHOD OF OCCUPANT DIGITAL PROFILING FOR SEAMLESS EXPERIENCE AND ACTIONABLE INSIGHTS

(71) Applicant: GM Global Technology Operations LLC, Detroit, MI (US)

(72) Inventors: Alaa M. Khamis, Courtice (CA); Donald K. Grimm, Utica, MI (US); Amin Abdossalami, Markham (CA); Terry W. Ostan, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 18/454,383

(22) Filed: Aug. 23, 2023

(65) Prior Publication Data
US 2025/0069129 A1 Feb. 27, 2025

(51) Int. Cl.
*G06Q 30/0601* (2023.01)
*G06Q 50/00* (2012.01)
*G07C 5/00* (2006.01)

(52) U.S. Cl.
CPC ..... *G06Q 30/0629* (2013.01); *G06Q 30/0631* (2013.01); *G06Q 50/01* (2013.01); *G07C 5/008* (2013.01)

(58) Field of Classification Search
CPC .......... G06Q 30/0629; G06Q 30/0631; G06Q 50/01; G07C 5/008; G06F 16/242; G06F 3/0481; G06F 16/2433; G06F 16/367
(Continued)

(56) References Cited

U.S. PATENT DOCUMENTS

| 10,405,152 B1* | 9/2019 | Prabhudeva | H04L 67/306 |
| 2012/0053793 A1* | 3/2012 | Sala | B60N 2/0035 |
| | | | 701/45 |
| 2015/0120135 A1* | 4/2015 | Lawrenson | B60R 16/037 |
| | | | 701/36 |

FOREIGN PATENT DOCUMENTS

| CN | 107199966 A | * | 9/2017 |
| CN | 107949504 A | * | 4/2018 |

(Continued)

OTHER PUBLICATIONS

Dai, Y., et al. "A Survey on Knowledge Graph Embedding: Approaches, Applications and Benchmarks," Electronics, vol. 9, No. 5, 2020.
(Continued)

*Primary Examiner* — Muhammad Shafi
(74) *Attorney, Agent, or Firm* — Vivacqua Crane, PLLC (57) ABSTRACT

A method of occupant profiling for seamless experience and actionable insights. The method includes receiving occupant data about an occupant of a host vehicle, generating a knowledge graph based on the occupant data using automotive ontology, querying the knowledge graph to generate an occupant profile comprising the wants and the needs of the occupant of the host vehicle, communicating the occupant profile to a target vehicle, comparing features of a target vehicle to features of the host vehicle to determine a compatible feature, and configuring the at least one compatible feature of the target vehicle based on the occupant profile. The compatible feature is a vehicle feature present in both the target vehicle and the host vehicle. The occupant data includes meta-data about the occupant of the host vehicle, customer-facing features of the host vehicle, and interaction data between the occupant and the customer-facing features of the host vehicle.

16 Claims, 8 Drawing Sheets

(58) Field of Classification Search
USPC .......................................................... 701/23
See application file for complete search history.

(56) References Cited

FOREIGN PATENT DOCUMENTS

DE       102022117076      *  2/2023
JP            5428611 B2  *  2/2014

OTHER PUBLICATIONS

The Automotive Ontology Working Group. "Automotive Data Interoperability at Web Scale," www.automotive-ontology.org, accessed Aug. 14, 2023.

* cited by examiner

METHOD OF OCCUPANT DIGITAL PROFILING FOR SEAMLESS EXPERIENCE AND ACTIONABLE INSIGHTS

INTRODUCTION

The present disclosure relates to autonomous vehicles; more particularly to a method for occupant digital profiling for seamless experience and actionable insights.

Autonomous vehicles employ driver assistance technologies to reduce or eliminate the need for a human operator. Such driver assistance technologies may include Automated Driving Systems (ADS) and Advanced Driver-Assistance Systems (ADAS). ADS are capable of operating the vehicle from partial autonomous mode to full autonomous mode in accordance with SAE J3016 levels of driving automation from Level 0 (no driving automation) to Level 5 (full driving automation). ADAS use sensors in the vehicle such as radar and cameras to perceive the world around it, and then either provides information to the driver or takes automatic action based on what it perceives. Certain ADAS include driver information acquisition systems (DIAS) that are configured to collect information on the status of the driver to improve vehicle safety. The DIAS utilize sensors such as optical cameras disposed in the cabin of the autonomous vehicle to monitor the alertness of the driver. If the DIAS determines the driver to be below a predetermined alertness threshold, the DIAS may initiate an alert to the driver and/or instruct the ADS to take over the operation of the vehicle.

The DIAS may collect information on a particular driver's vehicle component setting preferences to enhance the driving experience of the particular driver. Such vehicle component setting preferences include, but are not limited to, infotainment configurations, cabin temperature settings, steering wheel positions, seating positions, and instrument lighting settings. Each time the DIAS recognizes the particular driver, the DIAS may configure the vehicle component settings to the particular driver's preferences. This is particularly useful when there are multiple drivers for the same vehicle.

Thus, while current DIAS achieve their intended purpose, the current DIAS system is limited to a particular driver and to the features of the particular vehicle in which the driver's information is collected. There is need for a method that can generate a digital occupant profile that is portable for a seamless experience in transition to other autonomous vehicles having various features. There is a further need for a method that can concatenate a plurality of occupant profiles for generating actionable insights.

SUMMARY

According to several aspects, a method of occupant profiling for seamless experience and actionable insights is disclosed. The method includes receiving occupant data about an occupant of a host vehicle; generating a knowledge graph based on the occupant data using automotive ontology; querying the knowledge graph to generate an occupant profile including the preferences of the occupant of the host vehicle; communicating at least a portion of the occupant profile to a target vehicle; comparing features of the target vehicle to features of the host vehicle to determine at least one compatible feature, wherein the at least one compatible feature is a vehicle feature present in both the target vehicle and the host vehicle; and configuring the at least one compatible feature of the target vehicle based on the occupant profile.

In an additional aspect of the present disclosure, the method further includes comparing features of the target vehicle to features of the host vehicle to determine at least one not compatible feature, wherein the at least one not compatible feature is a vehicle feature present in the target vehicle and missing in the host vehicle, and recommending coaching on the vehicle feature present in the target vehicle and missing in the host vehicle.

In another aspect of the present disclosure, the method further includes comparing features of the target vehicle to features of the host vehicle to determine at least one not compatible feature, wherein the at least one not compatible feature is a vehicle feature present in the host vehicle and missing in the target vehicle; and recommending upgrading of the target vehicle to include the vehicle feature present in the host vehicle.

In another aspect of the present disclosure, the vehicle feature missing in the target vehicle is a subscription for a software enabled feature in the target vehicle. Recommending upgrading of the target vehicle includes recommending activating the subscription for the software enabled feature in the target vehicle based on the preferences of the occupant.

In another aspect of the present disclosure, the occupant data includes meta-data about the occupant of the host vehicle, customer-facing features of the host vehicle, and interaction data between the occupant and the customer-facing features of the host vehicle. The meta-data about the occupant includes demographic data, physiological data, biometric data, psychological data, and social data.

In another aspect of the present disclosure, the method further includes receiving a plurality of sets of occupant data about a plurality of occupants of a plurality of host vehicles; generating an individual knowledge graph for each one of the plurality of sets of occupant data; generating a graph embedding for each of the individual knowledge graphs; generating a graph embedding concatenation by concatenating the graph embeddings; and training a machine learning architect with the graph embedding concatenation to generate an actionable insight.

In another aspect of the present disclosure, the generating of the graph embedding for each of the individual knowledge graphs is conducted at one of a node level, a link level, and a graph level.

In another aspect of the present disclosure, the host vehicle is an autonomous vehicle having an occupant profiling system configured to execute the method.

According to several aspects, a tangible, non-transitory, machine-readable medium, including machine-readable instructions, that when executed by a processor, cause the processor to: receive occupant data; generate a knowledge graph based on the occupant data using automotive ontology; and query the knowledge graph to generate an occupant profile comprising the preferences of the occupant. The occupant data includes meta-data about an occupant of a host vehicle, customer-facing features of the host vehicle, and interaction data between the occupant and the customer-facing features of the host vehicle.

In an additional aspect of the present disclosure, the meta-data about the occupant includes social data of the occupant including at least one of family relationships, friends, acquaintances, and social media accounts.

In another aspect of the present disclosure, the machine-readable instructions, that when executed by the processor, further cause the processor to: compare features of a target vehicle to features of the host vehicle to determine at least one compatible feature, wherein the at least one compatible feature is a vehicle feature present in both the target vehicle and the host vehicle; and send instructions to the target vehicle to configure the at least one compatible feature of the target vehicle in accordance with the preferences of the occupant.

In another aspect of the present disclosure, the machine-readable instructions, that when executed by the processor, further cause the processor to: compare features of a target vehicle to features of the host vehicle to determine a vehicle feature present in the target vehicle and missing in the host vehicle; and recommend coaching on the at least one not compatible feature in response to determining the vehicle feature is present in the target vehicle and missing in the host vehicle.

In another aspect of the present disclosure, the machine-readable instructions, that when executed by the processor, further cause the processor to: compare features of a target vehicle to features of the host vehicle to determine a vehicle feature missing in the target vehicle and present in the host vehicle; and recommend upgrading of the target vehicle to include the vehicle feature present in the host vehicle in response to determining the vehicle feature is missing in the target vehicle and present in the host vehicle.

According to several aspects, a tangible, non-transitory, machine-readable medium, comprising machine-readable instructions, that when executed by a processor, cause the processor to: receive a plurality of sets of occupant data; generate an individual knowledge graph for each of the sets of occupant data; generating a graph embedding for each of the individual knowledge graphs; generate a graph embedding concatenation by concatenating the graph embeddings; and train a machine learning architect with the graph embedding concatenation to generate an actionable insight. The individual knowledge graphs are based on automotive ontology.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term module, control module, or controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

Figure 1:
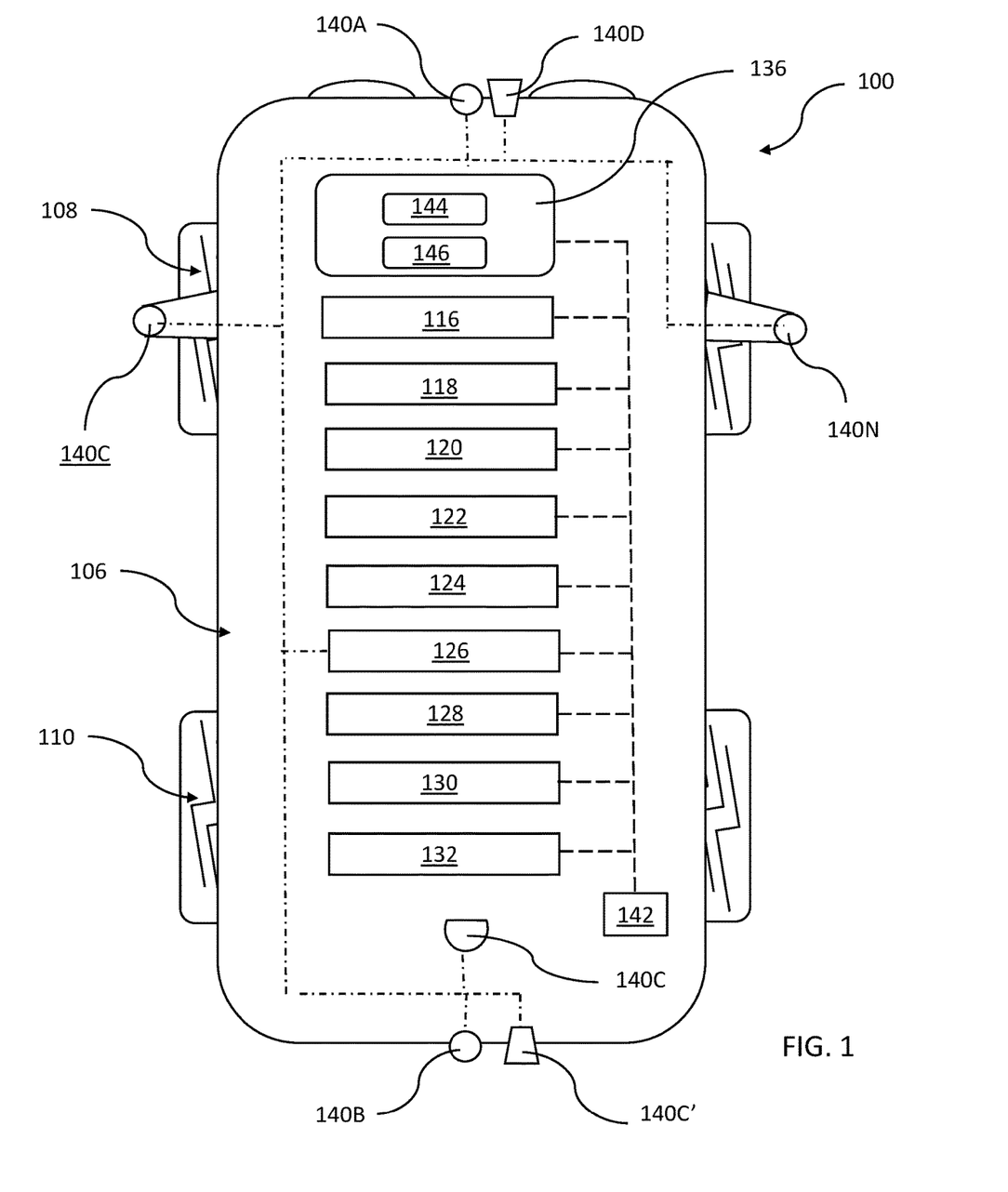
FIG. 1 is a functional diagram of an autonomous vehicle, according to an exemplary embodiment.

FIG. 1 shows a functional block diagram representation of an autonomous vehicle 100 capable of operating from Level 0 (no driving automation) to Level 5 (full driving automation) in accordance with SAE J3016 levels of driving automation. The vehicle 100 generally includes a body 106, front wheels 108, and rear wheels 110. The body 106 substantially encloses components of the vehicle 100. The front wheels 108 and the rear wheels 110 are each rotationally coupled to the body 106 near a respective corner of the body 106. As shown, the vehicle 100 generally includes a vehicle sensor system 116, an object detection system 118, a propulsion system 120, a transmission system 122, a steering system 124, a brake system 126, an actuator system 128, a vehicle communication system 130, an occupant profiling system 132, and at least one vehicle controller 136. While the vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft.

The vehicle sensor system 116 includes one or more vehicle external sensing devices 140A-140N, also referred to external sensors 140A-140N, configured to sense observable conditions of the exterior environment of the vehicle 100 and internal sensing devices 152A-152N (best shown in FIG. 2), also referred to as internal sensors, configured to sense observable conditions within the occupant compartment of the vehicle 100. Examples of vehicle external sensing devices 140A-140N include, but are not limited to, radars 140A, lidars 140B, cameras 140C, ultrasonic sensors 140D, and other external sensors 140N capable of gathering and/or receiving information on the external surroundings of the vehicle. Examples of vehicle internal sensing devices 152A-152N include, but are not limited to, optical and thermal cameras 152A, low frequency radars 152B, and other sensors 140N capable of gathering and/or receiving information on occupants and vehicle component settings within the vehicle cabin. Occupants include the driver or operator of the vehicle and any passengers within the vehicle cabin.

The object detection system 118 is configured to receive object data from the vehicle sensor system 116, detect one or more candidate objects in the object data, and predict an object class of each of the detected objects. The object detection system 118 is pre-trained to predict pre-defined object classes using pre-defined concepts associated with each of the pre-defined object classes. The object detection system 118 is also pre-trained to predict predefined behaviors and preferences of the occupants using pre-defined concepts associated with each of the pre-defined behaviors and preferences of the occupants.

The propulsion system 120 may, in various embodiments, include an internal combustion engine, an electric machine such as a traction motor, and/or a fuel cell propulsion system. The transmission system 122 is configured to transmit power from the propulsion system 120 to the front wheels 108 and the rear wheels 110 according to selectable speed ratios. According to various embodiments, the transmission system 122 may include a step-ratio automatic transmission, a continuously-variable transmission, or other appropriate transmission.

The brake system 126 is configured to provide braking torque to the front wheels 108 and the rear wheels 110. The brake system 126 may, in various embodiments, include friction brakes, brake by wire, a regenerative braking system such as an electric machine, and/or other appropriate braking systems. The steering system 124 influences the position of the front wheels 108 and the rear wheels 110. While depicted as including a steering wheel for illustrative purposes, in some embodiments contemplated within the scope of the present disclosure, the steering system 124 may not include a steering wheel.

The actuator system 128 includes one or more actuator devices 142 configured to control one or more vehicle features such as for example, but not limited to, the propulsion system 120, the transmission system 122, the steering system 124, and the brake system 126. The one or more actuator devices 142 may be configured to control one or more vehicle features located within the passenger compartment such as steering wheel positions, seating positions, infotainment settings, and cabin environment settings.

The vehicle communication system 130 is configured to wirelessly communicate information to and from other entities ("vehicle-to-everything (V2X)" communication). For example, the vehicle communication system 130 is configured to wireless communicate information to and from other vehicles ("vehicle-to-vehicle (V2V)" communication), to and from driving system infrastructure ("vehicle to infrastructure (V2I)" communication), remote systems, and/or personal devices. In an embodiment, the vehicle communication system 130 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The occupant profiling system 132 is configured to receive information on an occupant of the vehicle from the internal sensors, vehicle communication system 130, and other sources of information on the occupant. An occupant may include the driver, operator, or passenger of the vehicle and is a user of the occupant profiling system 132. The occupant is also referred to as a user or a customer. Information on the occupant is also referred to as occupant information.

Occupant information include, but are not limited to, meta-data about the occupant and the features and the interaction data between the occupant and the customer-facing features in the vehicles. The occupant information is used to generate an occupant knowledge graph, which is used to generate an occupant profile. The occupant profile is used to enhance the experience of the occupant by enabling a seamless transition from a host vehicle to a target vehicle. The host vehicle is the vehicle in which information is gathered on the occupant. The target vehicle is the vehicle that the occupant is transitioning to or migrating to from the host vehicle. The occupant profile is scalable, meaning that the occupant profile may be combined with other occupant profiles from various vehicles for machine learning to generate actionable insights. Actionable insights include, but are not limited to, quantifiable Net Promoter Score (NPS) at feature-level, vehicle-level, and fleet-level; most commonly used features; preference for features and services and match customers to features they likely want the most; customer segmentation for targeted marketing, retention, and reduced variants; used together features, and bought together services, common claims, etc.; and anomaly detection.

The vehicle controller 136 includes at least one processor 144 and a computer readable storage device 146. The computer readable storage device 146 may also be referred to as a computer readable media 146. The computer-readable storage device 146 is capable of storing data, some of which represent instructions executable by the processor 144, including algorithms for operating the various vehicle systems. The processor 144 and storage device 146 may be part of the vehicle controller 136, separate from the vehicle controller 136, or part of an individual vehicle system. Although only one vehicle controller 136 is shown in FIG. 1, alternative embodiments of the vehicle 100 can include any number of controllers that communicate over any suitable communication medium or a combination of communication mediums and that cooperate to process the sensor signals, perform logic, calculations, methods, and/or algorithms, and generate control signals to automatically control features of the vehicle 100.

Figure 2:
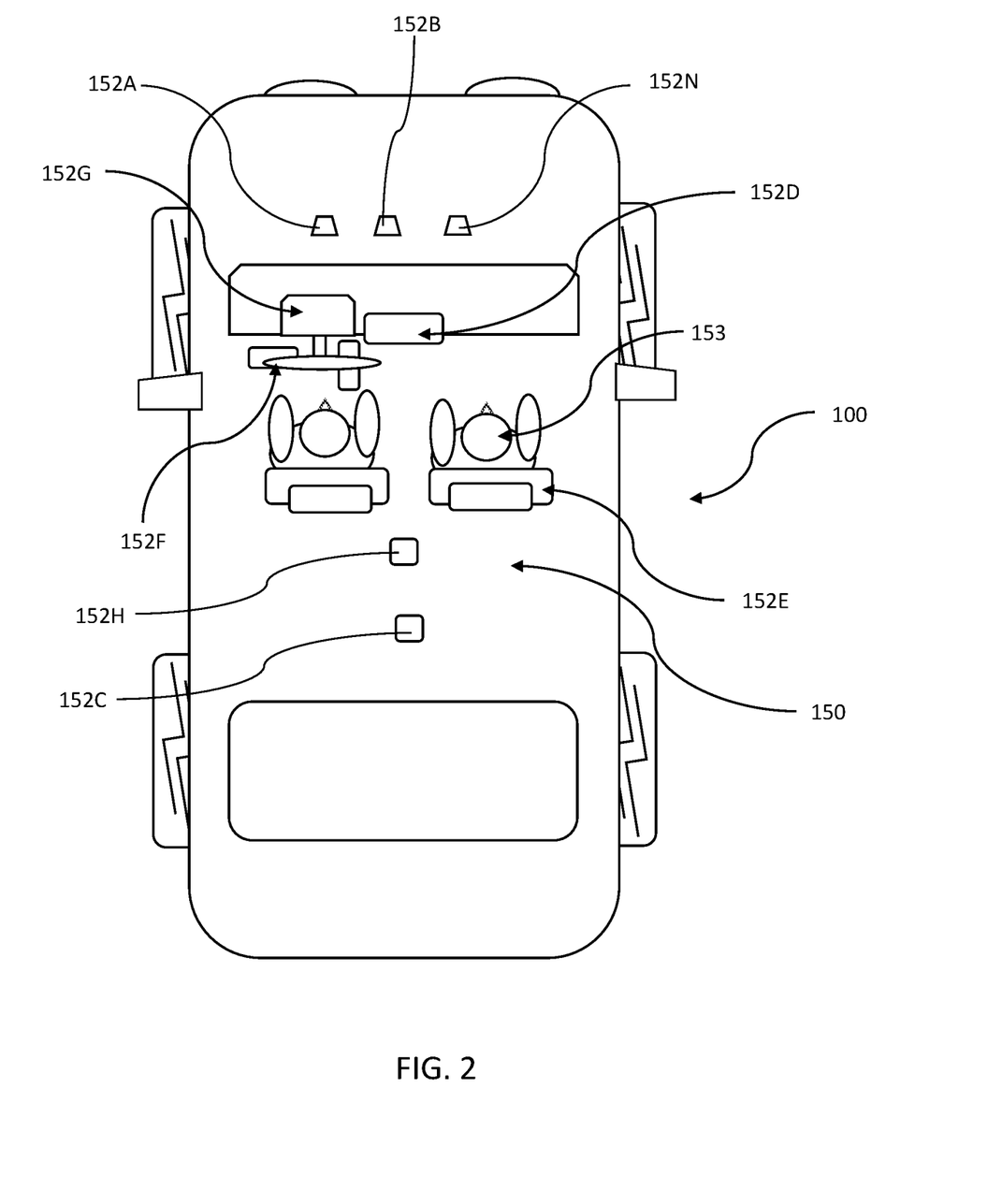
FIG. 2 is an diagrammatic illustration of an occupant compartment of the autonomous vehicle of FIG. 1, according to an exemplary embodiment.

FIG. 2 shows a diagrammatic illustration of a passenger compartment 150 of the vehicle 100. The passenger compartment 150 is also referred to as a vehicle cabin 150. The vehicle cabin 150 includes vehicle features that may be electronically adjusted or reconfigured by an occupant of the vehicle 100. Such vehicle features include, but are not limited to, the infotainment system, vehicle software applications, environmental system including heating and cooling, electronic human-machine-interfaces such back-up camera displays and instrument clusters, seating, mirror, sunroof, and other electronically adjustable components. The vehicle cabin 150 includes one or more actuator devices 142 configured to receive instructions from the profiling system 132 and/or vehicle controller 136 to reconfigure these vehicle features based on the occupant profile.

The vehicle cabin 150 is equipped with a plurality of vehicle component state and occupant sensors 152A-152N, referred to in the collective as internal sensors 152A-152N, configured to gather data on at least one occupant 153 in the vehicle cabin 150. The occupant 153 may be a driver, operator, or passenger of the vehicle 100. The internal sensors include, but are not limited to, optical and thermal cameras 152A, low frequency radars 152B, cabin environmental sensors such as temperature and humidity sensors 152C, infotainment setting sensors 152D, seating position sensors 152E, steering wheel adjustment sensors 152F, instrument display adjustment sensors 152G, pedal position sensors 152H, and other sensors 152N that can gather data on the occupant. The gathered data on the occupant 153, also referred to as occupant data, together with any other information pertaining to the occupant received by the vehicle communication system 130 is processed by the profiling system 132 to generate the occupant profile.

Figure 3:
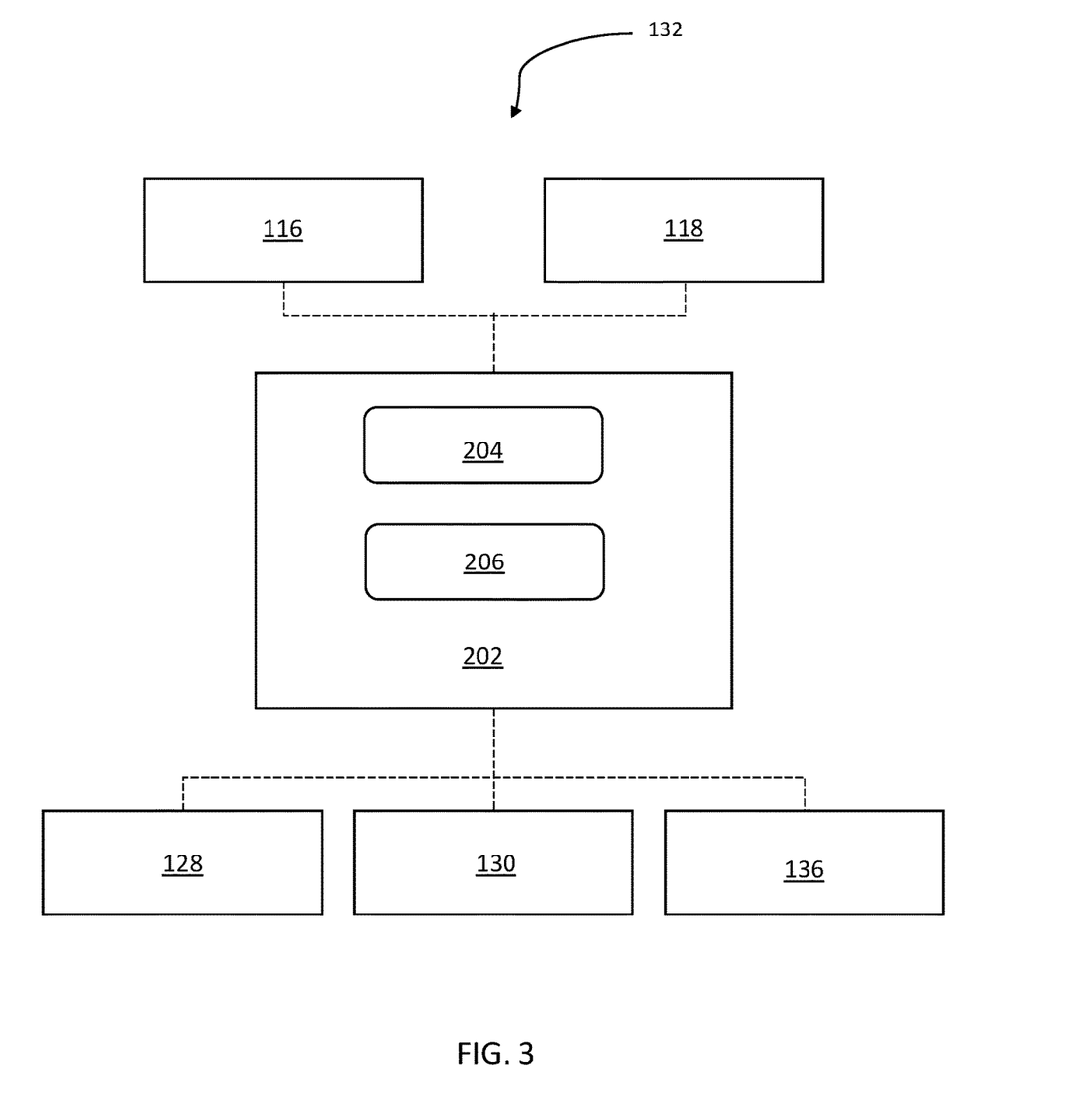
FIG. 3 is a functional diagram of a system for digital occupant profiling, according to an exemplary embodiment.

FIG. 3 is a function diagram of the occupant profiling system 132. The occupant profiling system 132 includes a system controller 202 in communications with at least one or more of the vehicle sensor system 116, the object detection system 118, the actuator system 128, the vehicle communication system 130, and the vehicle controller 136. The system controller 202 includes at least one system processor 204 and a system non-transitory computer readable storage device or media 206. The system processor 204 may be a custom made or commercially available processor, a central processing unit (CPU), a graphics processing unit (GPU), an auxiliary processor among several processors associated with the system controller 202, a semiconductor-based microprocessor (in the form of a microchip or chip set), a macro-processor, a combination thereof, or generally a device for executing instructions. The system computer readable storage device or media 206 may include volatile and nonvolatile storage in read-only memory (ROM), random-access memory (RAM), and keep-alive memory (KAM), for example. KAM is a persistent or non-volatile memory that may be used to store various operating variables while the system processor 204 is powered down. The system computer-readable storage device or media 206 of the system controller 202 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The system non-transitory computer readable storage device or media 206 may store occupant data received from one of the internal sensors 152A-152N and from the vehicle communication system 130.

The instructions may include one or more separate programs, each of which comprises an ordered listing of executable instructions for implementing logical functions. The instructions, when executed by the system processor 204, receive and process signals from the internal sensors 152A-152N and vehicle communication system 130, perform logic, calculations, methods and/or algorithms for generating an occupant knowledge graph, an occupant profile and/or, and generate control signals to the actuators to automatically control the vehicle features of the host vehicle 100 or communicate at least a portion of the occupant profile to a target vehicle.

Although a single system controller 202 is shown, the profiling system 132 may include a one or more system controllers 202 located on-board or off-board the vehicle 100 in a cloud based server configured to communicate over a suitable communication medium or a combination of communication mediums and that cooperate to process the sensor signals, perform logic, calculations, methods, and/or algorithms, and generate control signals to automatically control features of the profiling system 132. In various embodiments, one or more instructions of the system controller 202 are embodied in the profiling system 132. The system non-transitory computer readable storage device or media 206 and/or the vehicle non-transitory computer readable storage device or media 206 includes machine-readable instructions that when executed by the one or more system processors 204, cause the system processors 204 to execute the methods and processes described below.

Figure 4:
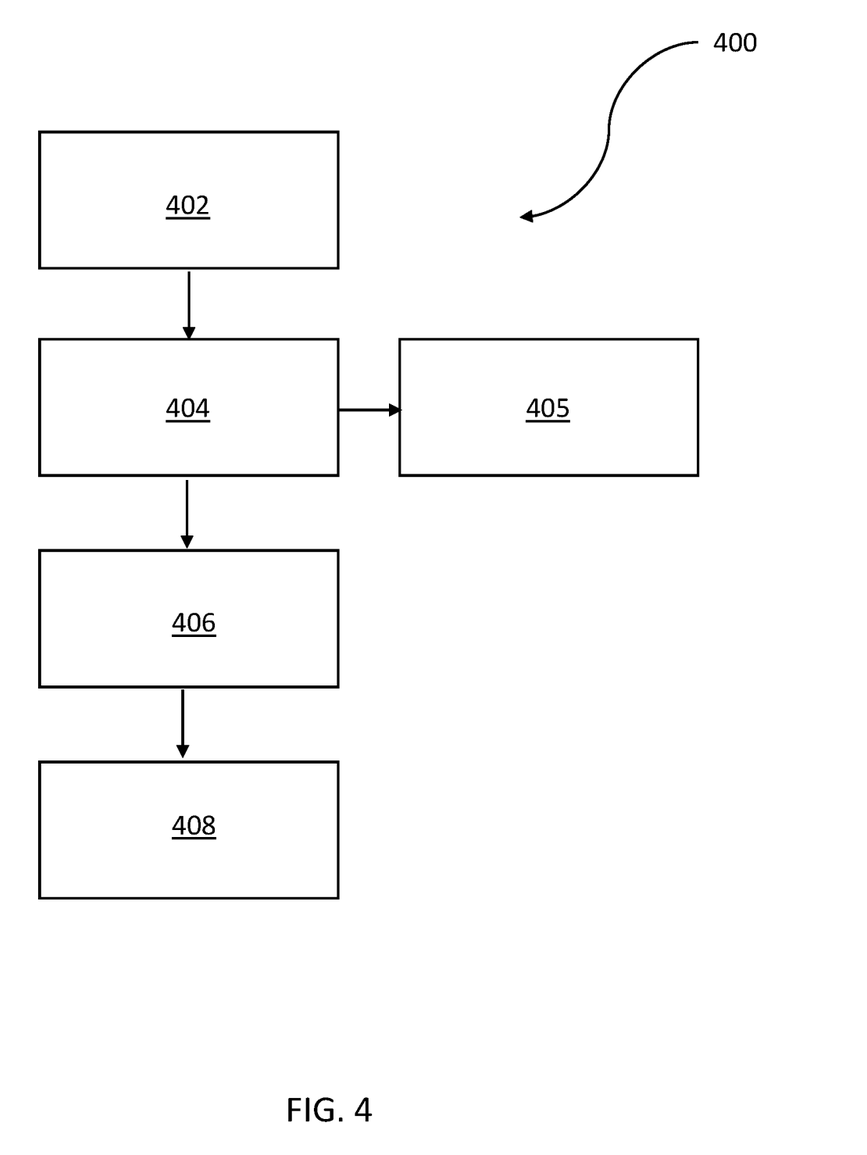
FIG. 4 is a block diagram of a method of using a knowledge graph for generating a digital occupant profile for seamless transition and actionable insights, according to an exemplary embodiment.

FIG. 4 is a block diagram of a method 400 of using an occupant knowledge graph for generating an occupant profile for a seamless transition of the occupant from a host vehicle to a target vehicle and/or for machine learning to generate actionable insights. A host vehicle means the vehicle in which information is gathered on the occupant for developing the occupant knowledge graph, from which the occupant profile is generated. A target vehicle is the vehicle in which the occupant is transitioning to from the host vehicle.

The method 400 includes Block 402, gathering and receiving occupant data; Block 404, generating an occupant knowledge graph based on the occupant data; Block 405, generating an occupant profile based on the knowledge graph; Block 406, generating a graph embedding based on the knowledge graph; and Block 408, training a machine learning (ML) architect on the graph embedding or a concatenation of a plurality of graph embeddings to generate actionable insights.

In Block 402, occupant data is collected on the behaviors and preferences of an occupant, also referred to as a user, by the internal sensors. Additional occupant data may be received from external sources such as social media accounts, subscription services, dealer information, and the likes. The occupant data to be included in the knowledge graph includes meta-data about the occupant and the features and the interaction data between the occupant and the customer-facing features in the vehicles. Examples of occupant data include, but not limited to, occupant meta-data such as demographic data, physiological data, biometric data, psychological data, and social data as shown in Table 1; occupant specific service and customer-facing features meta-data as shown in Table 2; and occupant interaction data as shown in Table 3. The occupant data may be further categorized as constant or slow-changing variables, and fast-changing variables.

TABLE 1

| Data Type | Constant/slow-changing variables | Fast-changing variables |
| --- | --- | --- |
| Demographic data/ Physiological data/Biometric data | Name, Age, Race Size Weight Spoken Languages Body temperature Fingerprints Facial features Iris patterns Retinal features Voiceprint | Location Head pose Other parts poses (2D/3D Skeleton) Heart rate Blood pressure Respiration rate Glucose level Blink rate |
| Psychological data | Emotional state Mental well-being | Facial expressions Voice emotions |
| Social data | Parent/Children Spouse | Friends Acquaintances |

TABLE 2

| Data Type | Constant/slow-changing variables | Fast-changing variables |
| --- | --- | --- |
| Vehicle | VIN Body platform Color Model Year Ownership | Mileage Fuel consumption L/100 km or kWh/100 km Fuel level/driving range Rental in case of shared vehicles Route (fixed or variable) in case of self-driving shuttles . . . |
| Telematics | Subscription Calls | Internet usage Diagnostic report |
| Cabin | Seat (tilt, pan, rail) Windows and sunroof (setting) Windshield (setting) Steering wheel (height, heat) | Doors (status, ingress, and egress), Seatbelt (status, buckling, pretensioner) Remote lock (horn, light, both) HVAC (modes and setting) |
| ADAS application | Health Monitoring Vehicle Feature Score | Engagement/ disengagement Missing Opportunities |
| . . . Etc. | | |

TABLE 3

| Constant/slow-changing variables | Fast-changing variables |
| --- | --- |
| Cabin configuration (seat setting, steering wheel height, remote lock feedback mode, etc.) Feature utilization Claims Owned Vehicle & Subscription Driving behavior Charging behavior Voice assistant used Interaction with dealership | Interaction with other occupants Interaction with Telematic (e.g. OnStar) live advisors Responses to stimuli like warning or promotion Genres listen to Songs repeated |

Figure 5:
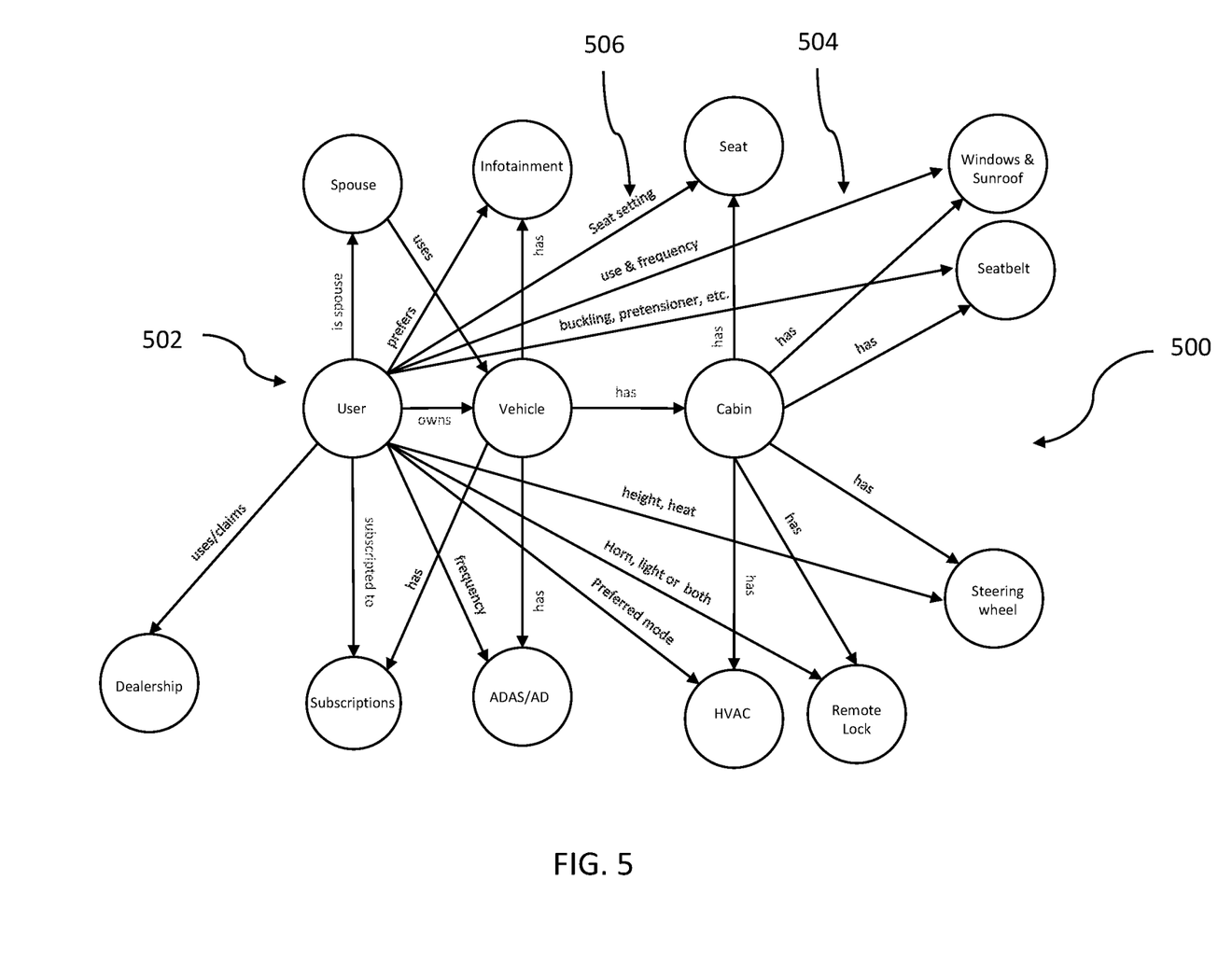
FIG. 5 is a knowledge graph based on automotive ontology, according to an exemplary embodiment.

In Block 404, a knowledge graph is generated based on ontology of the gathered occupant data. Referring to FIG. 5, the gathered occupant data is contextualized into a knowledge graph 500 of meaningful information based on automotive ontology. The knowledge graph 500 is an ever-evolving graph-structured data type used to encode both meta-data (about occupant/user and in-vehicle customer-facing features) and the interaction data between the occupant/users and the in-vehicle customer-facing features and other out-vehicle entities of interest represented as nodes such as dealership, auto insurance, home, social media, etc.

The occupant knowledge graph includes three main components: nodes 502, edges 504, and properties 506. Nodes 502 represent real-world entities such as users and customer-facing features. Edges 504 or relationships define the connections between these nodes. Properties 506 can be associated with these nodes 502 and edges 504 to represent defined meta-data and interaction data about the entities of interest. Benefits anticipated from using knowledge graphs includes capturing dynamic interactions between different entities of interest and empowering semantic search with context.

Knowledge Graph technologies include the Resource Description Framework (RDF) and labeled Property Graph (LPG) approach. Resource Description Framework (RDF) and the SPARQL query language are defined by the World Wide Web Consortium (W3C). The labeled Property Graph (LPG) approach and the Cypher query language adopted by graph technology vendors. There are also formal ontologies that can be used to define a set of concepts and categories to be included in the occupant knowledge graph, such as Automotive Ontology as taught by the Automotive Ontology Working Group (The Automotive Ontology Working Group. "Automotive Data Interoperability at Web Scate". www.automotive-ontology.org. Accessed 14 Aug. 2023).

Figure 6:
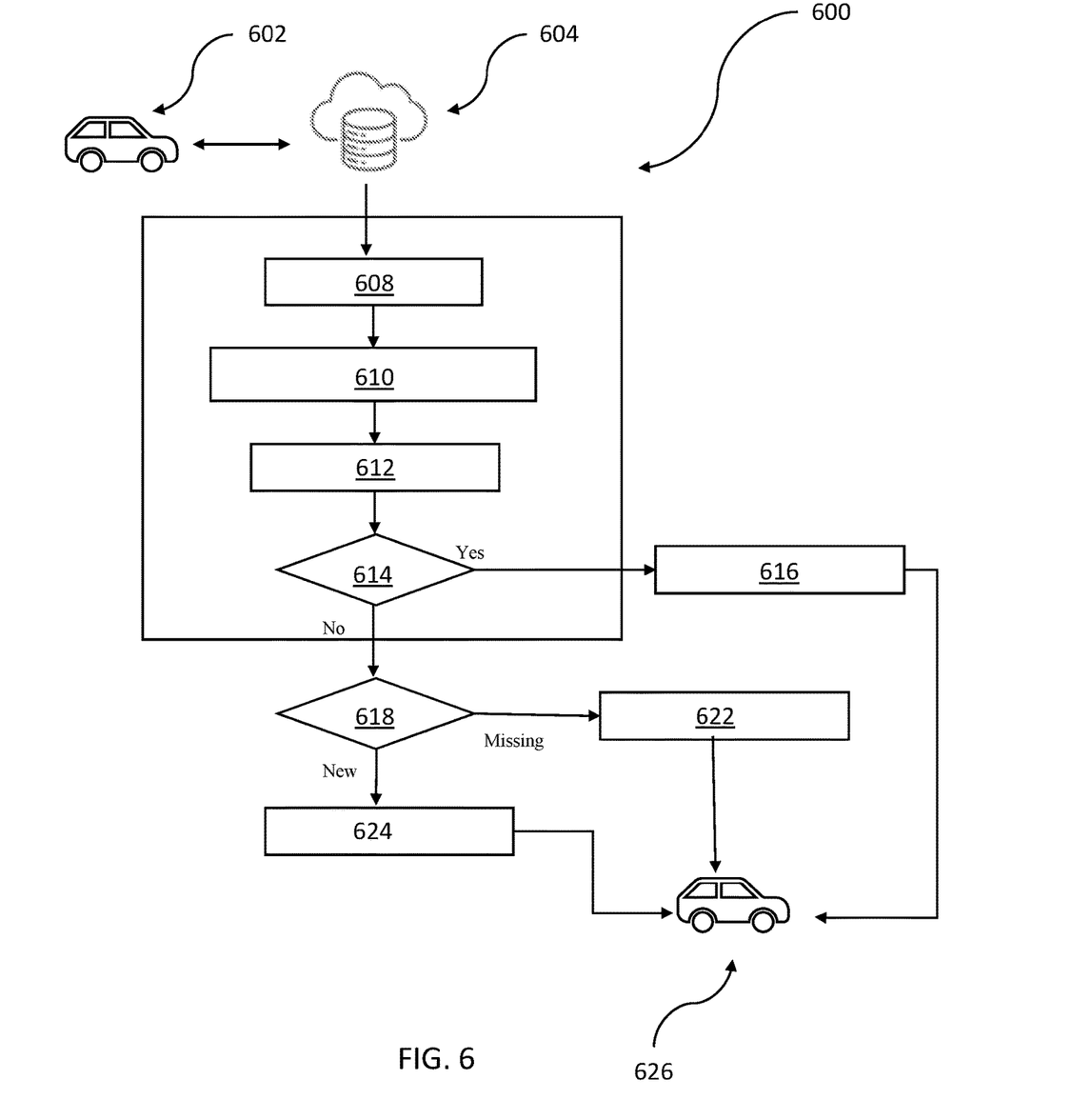
FIG. 6 is a functional diagram of a method of seamlessly transferring an occupant from a host vehicle to a target vehicle using a digital occupant profile based on a knowledge graph, according to an exemplary embodiment.

In Block 405, an occupant profile may be generated based on querying the knowledge graph by using, for example, SPARQL query language or Cypher query language. Resource Description Framework (RDF) and the SPARQL query language are defined by the World Wide Web Consortium (W3C). The labeled Property Graph (LPG) approach and the Cypher query language are adopted by graph technology vendors. The occupant profile may be used in for a Method 600 of seamlessly transferring the occupant from a host vehicle to a target vehicle.

In Block 406, a graph embedding is generated based on the knowledge graph from Block 404 and prepared for machine learning. Such techniques are described in Dai, Yuanfei; Wang, Shiping; Xiong, Neal N.; Guo, Wenzhong (May 2020). "A Survey on Knowledge Graph Embedding: Approaches, Applications and Benchmarks". Electronics. 9 (5): 750. doi: 10.3390/electronics9050750, which is hereby incorporated by reference in its entirety.

Figure 7A:
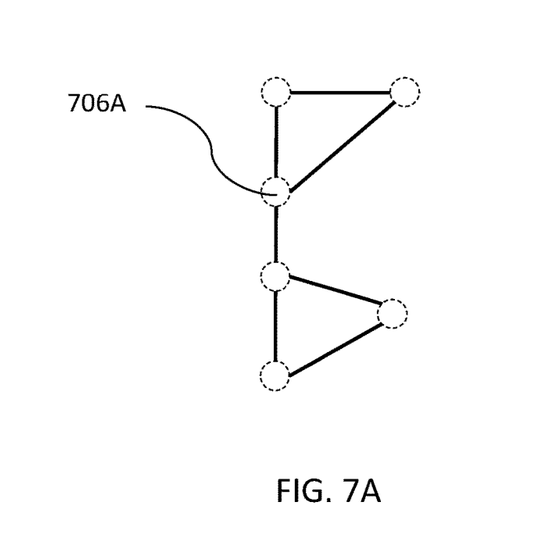
FIGS. 7A-7C are examples of a knowledge graph embedding at a node-level, a link-level, and a graph level, respectively, according to an exemplary embodiment.
Figure 7B:
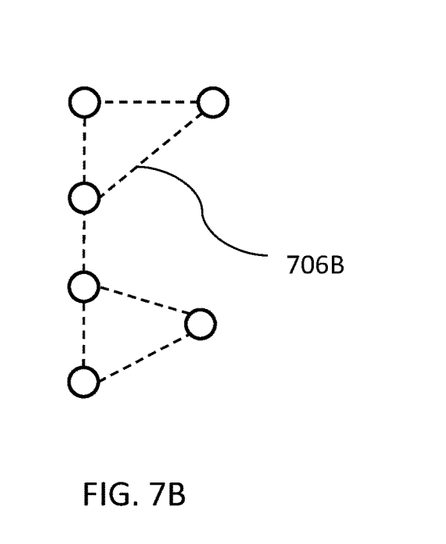
Figure 7C:
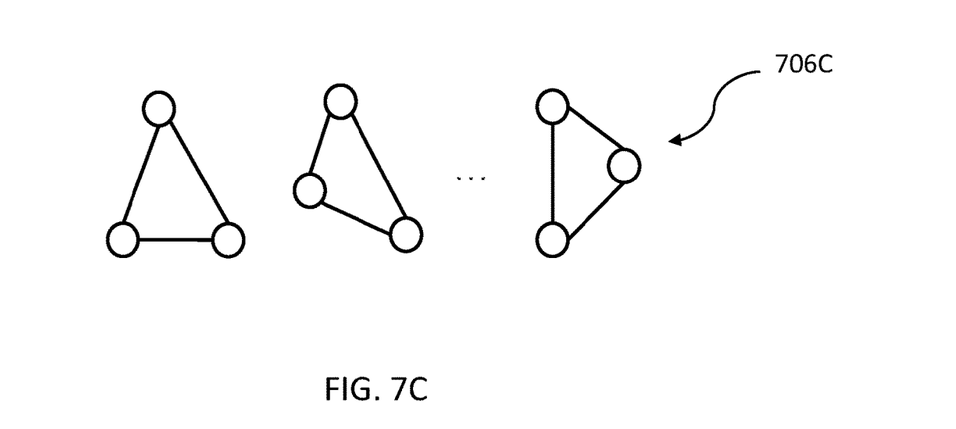

Referring to FIG. 7, the graph embedding may be conducted at different levels of graduality such as at the node-level 706A as shown in FIG. 7A, link-level 706B as shown in FIG. 7B, or at segmented graph level 706C as shown in FIG. 7C. Node level Embedding, $f: V \rightarrow \mathbb{R}^n$. Classification (e.g., feature's level of utilization, NPS of a specific feature, feature adoption). Link-level Embedding $f: E \rightarrow \mathbb{R}^n$. Link prediction (e.g., two features used together or disappearing links/service unsubscription). Graph-level Embedding $f: G \rightarrow \mathbb{R}^n$. Segmentation (e.g., customer segmentation), and anomaly detection.

Referring back to FIG. 4, in Block 408, the graph embedding is provided to a machine learning architect to generate actionable insights. The graph embedding may be concatenated with other graph embeddings from the same vehicle type or various vehicle types for predicting actionable insights by a ML architect. The ML architect may invoke one or more deep learning architectures such as deep neural networks, convolutional deep neural networks, deep belief networks, and/or recurrent neural networks to learn and predict actionable insights based on the graph embedding or concatenation of graph embeddings.

FIG. 6 is a functional diagram showing a Method 600 of seamless transfer of an occupant from a host vehicle 602 to a target vehicle 626. The occupant profiling system 132 of the host vehicle 602 collects occupant data to generate an occupant knowledge graph. The occupant knowledge graph enables an automotive ontology-powered, transferable, self-descriptive, intrinsically explainable, and contextual occupant digital profile that encodes multimodal meta-data about the occupant and the vehicle's features and their interaction. An occupant profile is generated by querying the occupant knowledge graph with a predetermined query based on the preferences, including wants and needs, of the occupant.

Moving to Block 604, the occupant profile is uploaded to a cloud server using the vehicle communication system 130. Blocks 608 through 618 may be performed by the system controller 202 on-board the host-vehicle 602 or in a cloud server 604. Moving to Block 608, the system controller 202 or cloud server 604 authenticates a request initiated by the occupant or a third party service acting on behalf of the occupant to transfer the occupant profile to a target vehicle 626. Moving to Block 610, the requestor selects an occupant profile, if there is more than one profile, or a portion of the occupant profile to be transferred to the target vehicle 626.

Moving to Block 612, the system controller 202 or cloud server 604 confirms whether the target vehicle 626 include vehicle features that are compatible with the vehicle features of the host vehicle 602. Compatible means the target vehicle includes substantially the same and/or functionally similar vehicle components, features, and/or software applications as the host vehicle that are relevant to occupant profile.

Moving to Block 614, if compatible, the Method 600 moves to block 616 and transfer the occupant profile to the target vehicle 626. The profiling system of the target vehicle 626 receives the occupant profile and instructs the actuators of the target vehicle 626 to configure the compatible vehicle features in accordance with the occupant preferences (e.g. personalization) identified in the occupant profile. Non-limiting examples of occupant preferences include personalized ergonomic setting (e.g. adjusting seat and steering wheel height) and visibility setting (e.g., adjusting the mirror, rear mirror camera zoom).

Referring back to Block 614, if not compatible, meaning the target vehicle 626 does not include certain vehicle components, features, and/or software applications that are substantially the same and/or functionally similar to those of the host vehicle 602, the Method 600 moves to Block 618. In Block 618, the system controller 202 determines if the target vehicle 626 is missing the vehicle components, features, and/or software applications of the host vehicle 602 or if the target vehicle 626 includes new or updated components, features, and/or software applications.

From Block 618, if the system controller determines that the target vehicle 626 is missing vehicle components, features, and/or software applications that are substantially the same and/or functionally similar to those of the host vehicle 602, the Method 600 moves to Block 622. In Block 622, the system controller 132 of the host vehicle 602 or the target vehicle 626 recommends upgrading the target vehicle 626 with the missing vehicle components, features, and/or software applications that are substantially the same and/or functionally similar to those of the host vehicle 602.

Referring back to Block 618, if the if the system controller 132 determines that the target vehicle 626 includes vehicle components, features, and/or software applications that are not present in the host vehicle 602 (i.e. new features in target vehicle), the Method 600 moves to Block 624. In Block 624, the system controller 132 of the host vehicle 602 or the target vehicle 626 recommends in-vehicle coaching to the occupant on the target vehicle's 626 components, features, and/or software applications that are not present in the host vehicle 602. The coaching may be active or proactive.

Figure 8:
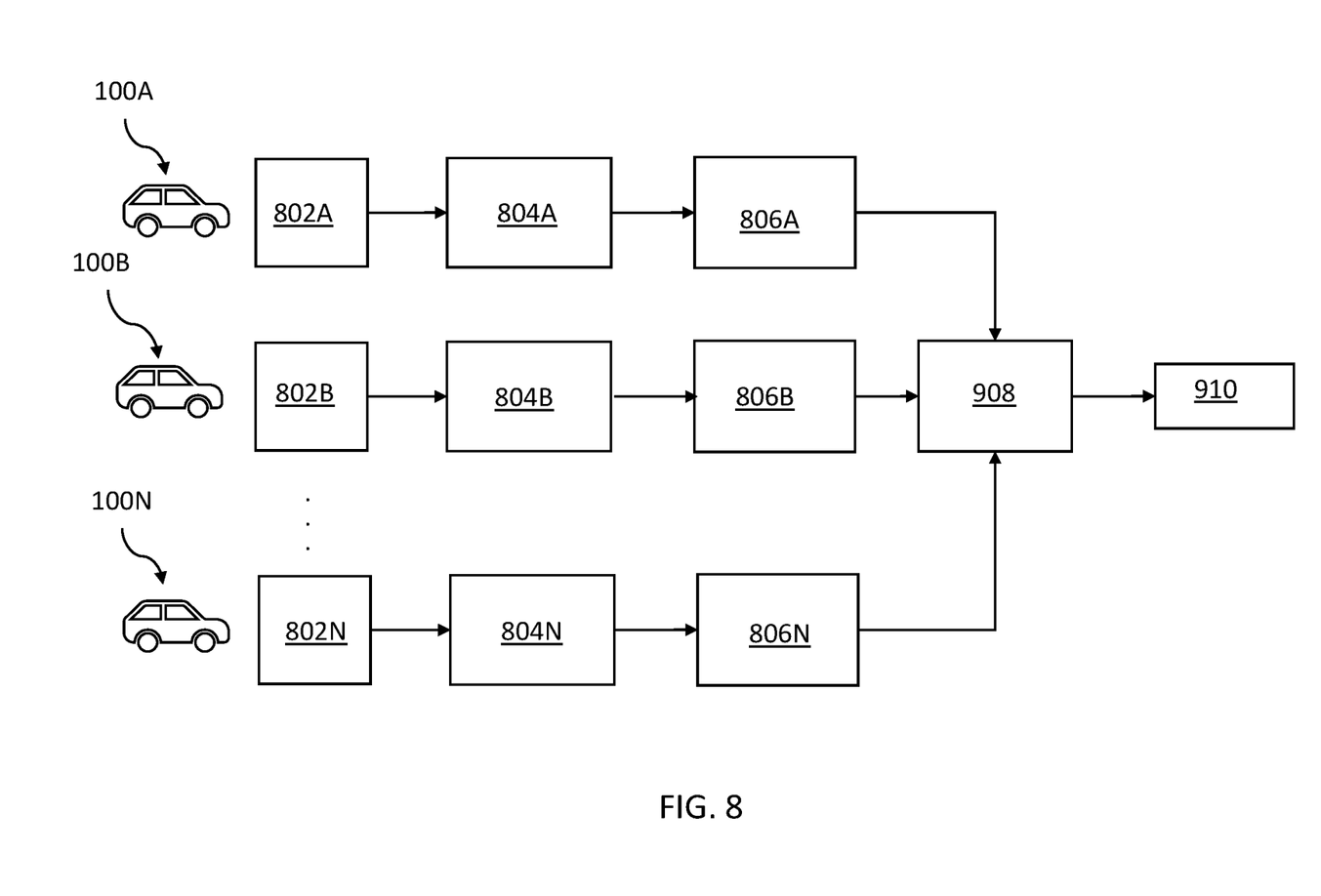
FIG. 8 is a block diagram of a method of concatenating multiple graph embeddings of knowledge graphs of occupant data for predicting actionable insights, according to an exemplary embodiment.

FIG. 8 a function block diagram using concatenated graph embeddings of a plurality of knowledge graphs based on the same vehicle type or a variety vehicle types for generating actionable analytics or insights. The graph embeddings are based on occupant knowledge graphs generated from occupant data gathered from a plurality of host vehicles 100A, 100B, 100N and from external sources. In Blocks 802A-802N, occupant data is collected on the behaviors and preferences of an occupant by the internal sensors and/or vehicle communication system. Moving to Blocks 804A-804N, individual occupant knowledge graphs are generated based on automotive ontology of the gathered occupant data. Moving to Blocks 806A-806N, knowledge graph embeddings are generated based on the occupant knowledge graphs and prepared for machine learning. Moving to Block 908, the knowledge graph embeddings are concatenated. Moving to Block 910, the concatenated knowledge graph embeddings are used in a ML architect to predict trends according to a set of predetermined training algorithms.

Such algorithms are designed to generate actionable analytics or insights. Examples of such actionable analytics or insights include, but are not limited to, determining a Quantifiable Net Promoter Score (NPS) at feature-level, vehicle-level and fleet-level; identifying most commonly used features; predicting preference for features and services and matching customers to features the customers likely want the most; identifying customer segmentation for targeted marketing, retention and reduced variants; predicting used together features, bought together services, common claims, etc.; and detecting anomalies.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of occupant profiling for seamless experience and actionable insights, comprising:
receiving occupant data on an occupant of a host vehicle;
generating a knowledge graph based on the occupant data using automotive ontology;
querying the knowledge graph to generate an occupant profile including preferences of the occupant of the host vehicle;
communicating at least a portion of the occupant profile to a target vehicle;
comparing features of the target vehicle to features of the host vehicle to determine at least one compatible feature, wherein the at least one compatible feature is a vehicle feature present in both the target vehicle and the host vehicle; configuring the at least one compatible feature of the target vehicle based on the occupant profile;
comparing features of the target vehicle to features of the host vehicle to determine at least one not compatible feature, wherein the at least one not compatible feature is a vehicle feature present in the host vehicle and missing in the target vehicle; and
recommending upgrading of the target vehicle to include the vehicle feature present in the host vehicle based on the preferences of the occupant of the host vehicle;

wherein the vehicle feature missing in the target vehicle is a subscription for a software enabled feature in the target vehicle; and wherein recommending upgrading of the target vehicle includes recommending activating the subscription for the software enabled feature in the target vehicle based on the preferences of the occupant of the host vehicle.

2. The method of claim 1, further comprising:

comparing features of the target vehicle to features of the host vehicle to determine at least one not compatible feature, wherein the at least one not compatible feature is a vehicle feature present in the target vehicle and missing in the host vehicle; and recommending coaching on the vehicle feature present in the target vehicle and missing in the host vehicle based on the preferences of the occupant of the host vehicle.

3. The method of claim 1, wherein the occupant data includes meta-data of the occupant of the host vehicle, customer-facing features of the host vehicle, and interaction data between the occupant and the customer-facing features of the host vehicle.

4. The method of claim 3, wherein the meta-data of the occupant includes demographic data, physiological data, biometric data, psychological data, and social data.

5. The method of claim 1, further comprising:

receiving a plurality of sets of occupant data on a plurality of occupants of a plurality of host vehicles;

generating an individual knowledge graph for each one of the plurality of sets of occupant data;

generating a graph embedding for each of the individual knowledge graphs;

generating a graph embedding concatenation by concatenating the graph embeddings; and training a machine learning architect with the graph embedding concatenation to generate an actionable insight.

6. The method of claim 5, wherein the generating of the graph embedding for each of the individual knowledge graphs is conducted at one of a node level, a link level, and a graph level.

7. The method of claim 5, wherein the actionable insight includes at least one of: a Quantifiable Net Promoter Score (NPS) at feature-level, vehicle-level, and fleet-level; commonly used features; customer preferences for features and services; customer segmentations for targeted marketing, vehicle retention and reduced vehicle variants; and used together vehicle features, and bought together services.

8. The method of claim 1, wherein the host vehicle is an autonomous vehicle having an occupant profiling system.

9. A non-transitory, machine-readable medium, comprising machine-readable instructions, that when executed by a processor, cause the processor to:

receive occupant data on an occupant of a host vehicle;

generate a knowledge graph based on the occupant data using automotive ontology; and query the knowledge graph to generate an occupant profile comprising preferences of the occupant;

wherein the occupant data comprises meta-data of the occupant, customer-facing features of the host vehicle, and interaction data between the occupant and the customer-facing features of the host vehicle; and wherein the meta-data of the occupant comprises social data of the occupant including at least one of family relationships, friends, acquaintances, and social media accounts.

10. The non-transitory, machine-readable medium of claim 9, wherein the machine-readable instructions, that when executed by the processor, further cause the processor to:

compare features of a target vehicle to features of the host vehicle to determine at least one compatible feature, wherein the at least one compatible feature is a vehicle feature present in both the target vehicle and the host vehicle; and send instructions to the target vehicle to configure the at least one compatible feature of the target vehicle in accordance with the preferences of the occupant.

11. The non-transitory, machine-readable medium of claim 9, wherein the machine-readable instructions, that when executed by the processor, further cause the processor to:

compare features of a target vehicle to features of the host vehicle to determine a vehicle feature present in the target vehicle and missing in the host vehicle; and recommend coaching on the at least one not compatible feature in response to determining the vehicle feature is present in the target vehicle and missing in the host vehicle.

12. The non-transitory, machine-readable medium of claim 9, wherein the machine-readable instructions, that when executed by the processor, further cause the processor to:

compare features of a target vehicle to features of the host vehicle to determine a vehicle feature missing in the target vehicle and present in the host vehicle; and recommend upgrading of the target vehicle to include the vehicle feature present in the host vehicle in response to determining the vehicle feature is missing in the target vehicle and present in the host vehicle.

13. A non-transitory, machine-readable medium, comprising machine-readable instructions, that when executed by a processor, cause the processor to:

receive a plurality of sets of occupant data;

generate an individual knowledge graph for each of the sets of occupant data;

generating a graph embedding for each of the individual knowledge graphs;

generate a graph embedding concatenation by concatenating the graph embeddings; and train a machine learning architect with the graph embedding concatenation to generate an actionable insight;

wherein the actionable insight includes one or more of: a Quantifiable Net Promoter Score (NPS) at feature-level, vehicle-level, and fleet-level; commonly used features; customer preferences for features and services; customer segmentations for targeted marketing, vehicle retention and reduced vehicle variants; and used together vehicle features, bought together services.

14. The non-transitory, machine-readable medium of claim 13, wherein the occupant data comprises meta-data on an occupant of a host vehicle, customer-facing features of the host vehicle, and interaction data between the occupant and the customer-facing features of the host vehicle.

15. The non-transitory, machine-readable medium of claim 14, wherein the meta-data of the occupant further comprises social data of the occupant including at least one of family relationships, friends, acquaintances, and social media accounts.

16. The non-transitory, machine-readable medium of claim 14, wherein the individual knowledge graphs are based on automotive ontology.

\* \* \* \* \*